United States Patent
Cecchi et al.

(10) Patent No.: US 6,681,070 B2
(45) Date of Patent: Jan. 20, 2004

(54) SUBMARINE OPTICAL CABLE RESISTANT TO LONGITUDINAL WATER PROPAGATION

(75) Inventors: Feliciano Cecchi, Inveruno (IT); Alessandro Ginocchio, Sesto San Giovanni (IT)

(73) Assignee: Pirelli Cavi e Sistemi S.p.A., Milan (IT)

( * ) Notice: Subject to any disclaimer, the term of this patent is extended or adjusted under 35 U.S.C. 154(b) by 0 days.

(21) Appl. No.: 10/056,077

(22) Filed: Jan. 28, 2002

(65) Prior Publication Data

US 2002/0136511 A1 Sep. 26, 2002

Related U.S. Application Data

(63) Continuation of application No. PCT/EP00/06530, filed on Jul. 10, 2000.
(60) Provisional application No. 60/147,025, filed on Aug. 3, 1999.

(30) Foreign Application Priority Data

Jul. 28, 1999 (EP) .............................. 99114716

(51) Int. Cl.$^7$ ................................. G02B 6/44
(52) U.S. Cl. ...................................... 385/109
(58) Field of Search ................ 385/109, 110, 385/113; 174/23 C

(56) References Cited

U.S. PATENT DOCUMENTS

| | | | | |
|---|---|---|---|---|
| 4,288,144 A | * | 9/1981 | Nakai et al. | 385/100 |
| 4,684,213 A | * | 8/1987 | Ishihara et al. | 385/107 |
| 4,711,523 A | * | 12/1987 | Iri et al. | 385/110 |
| 4,717,236 A | * | 1/1988 | Dewing | 385/109 |
| 4,741,592 A | | 5/1988 | Secco et al. | 350/96.23 |
| 5,125,062 A | * | 6/1992 | Marlier et al. | 385/113 |
| 5,455,881 A | | 10/1995 | Bosisio et al. | 385/100 |
| 5,463,711 A | | 10/1995 | Chu | 385/101 |
| 5,715,343 A | | 2/1998 | Anelli et al. | 385/100 |
| 5,917,977 A | * | 6/1999 | Barrett | 385/113 |

FOREIGN PATENT DOCUMENTS

| | | |
|---|---|---|
| DE | 3513859 A1 | 10/1985 |
| EP | 0 330 278 A2 | 8/1989 |
| EP | 0 577 299 A2 | 1/1994 |
| EP | 0 811 864 A1 | 12/1997 |
| EP | 0 883 007 A1 | 12/1998 |
| GB | 2 051 398 A | 1/1981 |
| GB | 2 253 717 A | 9/1992 |

\* cited by examiner

Primary Examiner—Tulsidas Patel
(74) Attorney, Agent, or Firm—Finnegan, Henderson, Farabow, Garrett & Dunner, L.L.P.

(57) ABSTRACT

A submarine optical cable resistant to a longitudinal flow of water accidentally penetrated inside it and a method for controlling the longitudinal flow of water inside the cable. The cable has a longitudinal cavity disposed along a deformable elongated hollow body. The longitudinal cavity is suitable dimensioned so that the head losses of the water flowing through the cavity are lower than the head losses of the water flowing inside the buffer tubes. Thus, in case of accidental ingress of water inside the submarine cable, the water flow inside the buffer tubes is prevented from reaching long penetration lengths by the hydrostatic pressure of the water inside the longitudinal cavity acting onto the outer surface of the buffer tube.

19 Claims, 3 Drawing Sheets

SUBMARINE OPTICAL CABLE RESISTANT TO LONGITUDINAL WATER PROPAGATION

CROSS REFERENCE TO RELATED APPLICATIONS

This application is a continuation of international application number PCT/EP00/06530, filed Jul. 10, 2000, the content of which is incorporated herein by reference, and claims the priority of European Patent Application No. 99114716.6, filed Jul. 28, 1999, and the benefit of U.S. Provisional Application No. 60/147,025, filed Aug. 3, 1999, the content of which is incorporated herein by reference.

BACKGROUND OF THE INVENTION

1. Field of the Invention

The present invention relates to a submarine optical cable resistant to a longitudinal flow of water accidentally penetrated inside it and to a method for controlling said longitudinal flow of water inside said cable.

Submarine optical cables are subjected, in case of accidental rupture thereof, to a sudden ingress of a sea-water flow at high pressure (e.g. 100 bar, when the cable is at 1000 m below the sea level). Such high pressure water flow may propagate for a relevant length inside the cable if suitable water blocking means are not provided in the cable, thus damaging a remarkable portion of said cable which has then to be replaced.

2. Description of the Related Art

A number of cables designed for submarine installation are known in the art.

For instance, U.S. Pat. No. 5,125,062 discloses an undersea cable comprising a central metallic tube, filled with a sealing compound, e.g. silica gel, and containing optical fibers embedded therein, said tube being surrounded by a helical lay of metallic (preferably steel) wires. Interstices between wires and between the helical lay and the central tube are filled with a sealing material (preferably polyurethane resin) which opposes longitudinal propagation of water along the cable. Alternatively, the central tube can be made of plastic and in this case the helical lay also presents the characteristics of an arch for withstanding pressure.

U.S. Pat. No. 4,684,213 relates to a submarine cable comprising a pressure resistant steel tube containing optical fibers, surrounded by two layers of steel wires and by an outer metal tube made of copper or aluminum. Dams of a sticky compound and/or of a jelly of plastic material are disposed at regular intervals inside the central tube and in the gaps between the lay of wires disposed between the central tube and the outer tube.

U.S. Pat. No. 5,463,711 discloses an underwater cable for shallow-water, comprising a central tube made of plastic or preferably of metal, optical fibers arranged within said tube and surrounded by a water blocking material and six steel wires wound in a helical lay around the central tube.

UK patent application no. 2,253,717 describes a method for manufacturing an optical cable in which a plurality of optical fibers are enclosed as they are fed in a longitudinal direction by a continuously fed metal strip folded around the fibers; the edges of said metal strip are welded together to form a tubular moisture barrier, the diameter of which, at the welding stage, provides sufficient clearance between the fibers and the heat affected zone of the welded tube. The diameter of the welded tube is then reduced by passages through the one or more sets of reducing rollers, the tube then closely surrounding the optical fire package. The diameter reduction increases the tensile strength of the metal tube.

In general, for submarine cables apt to operate at deep depths (e.g. below 500 meters) it is required that the water penetration length along the cable is less than 1000 meters after 2 weeks.

SUMMARY OF THE INVENTION

Applicant has now observed that when a tube (in particular a buffer tube containing optical fibers) is of relatively small internal diameter (e.g. below about 7 mm), it is rather difficult to achieve a complete filling of said tube with a suitable water-blocking gel. As a matter of fact, because of the relatively small diameter of buffer tubes specifically adapted for submarine cables (typically of about 2–5 mm) and of the relatively high viscosity of the filling jelly compound (generally from about 50 Pa·s to about 150 Pa·s), the filling of the tube can only be completed for about 80–95% of the internal volume of the tube. In addition, an incomplete filling of the buffer tube may be desirable in some instances, also for buffer tubes of larger dimensions. For instance, as disclosed in European Patent Application Publ. No. EP 883007, if optical fibers are exposed to hydrogen gas, the transmission properties thereof are altered, the higher being the partial pressure of hydrogen the more relevant said alterations. EP 883007 thus suggests filling only partially the buffer tube with a filling material (maximum 95%), in order to leave an expansion volume inside the tube so that the partial pressure of hydrogen is kept relatively low.

Thus, for different reasons, from about 5 to about 20% of the internal volume of the buffer tubes can be left free from water blocking gel material.

The applicant has now observed that, while this incomplete filling can be considered of relatively low importance for terrestrial cables (where longitudinal water penetration tests are conducted under a water head of 1 m), it becomes much more important for underwater cables. As a matter of fact, Applicant has observed that the voids due to the incomplete filling tend to dispose longitudinally along the whole length of the buffer tube, thus creating a preferential path along which a high pressure water flow (e.g. 100 bars if the cable is laid at a depth of 1000 m) can flow with relatively low head losses for a relevant length of the cable before being blocked.

In addition, if water has a preferential flow path inside the buffer tubes, the respective hydrostatic pressure may act on the inner surface of the plastic tube, thus increasing the diameter of the same; as a consequence, the flow path is increased in dimension and the water flow increases the speed and the penetration length inside the buffer tube.

Applicant has now found that by providing a suitably dimensioned longitudinal cavity (or "gap") defined along the outer surface of a buffer tube containing optical fibers, said buffer tube being made of a deformable material (e.g. polymeric material), it is possible to substantially reduce the longitudinal flow of water inside said buffer tube. For instance said buffer tube can be surrounded by a second tube made of a substantially non-deformable material (e.g. metal) having a larger inner diameter with respect to the outer diameter of the buffer tube, so to create the desired gap around the buffer tube. In particular, the Applicant has observed that the dimensions of the longitudinal space surrounding the buffer tube should be selected in order to provide along said space a preferential flow path for the water accidentally penetrated inside the cable, with respect to the flow path inside the buffer tube, thus preventing water from flowing inside said buffer tube. In other terms, the head losses of the water flowing along said longitudinal space surrounding the buffer tube should be lower than the head losses of the water flowing inside said buffer tube.

One aspect of the present invention thus relates to a method for controlling a longitudinal flow of water accidentally penetrated inside the structure of a submarine cable, said cable comprising a deformable elongated hollow body comprising at least one optical fiber loosely housed therein, wherein said method comprises causing the water to flow inside the cable, but outside said deformable elongated hollow body, for a distance longer than the distance of the water flowing inside said deformable elongated hollow body.

In particular, the water flow through said deformable elongated hollow body has a first head loss, while the water flow inside the cable, but outside said deformable elongated hollow body, has a second head loss, said second head loss being lower than said first head loss.

Preferably, said method comprises the steps of:
- disposing within said cable structure a first elongated hollow body defining an inner surface;
- disposing within the inner surface of said first elongated hollow body an optical core comprising at least a second deformable elongated hollow body comprising at least one optical fiber loosely housed therein;
- defining a longitudinal cavity inside said first elongated hollow body and outside said deformable elongated hollow body;
- disposing a water blocking element within said space
- causing the water to flow with a lower head loss through said cavity than through said deformable elongated hollow body.

Preferably, said first elongated hollow body is a substantially non-deformable elongated hollow body.

Advantageously, the head losses of the water flow along said longitudinal space can be lower than about 75% of the head losses of the water flow inside the deformable elongated hollow body, preferably lower than about 50%, much preferably lower than about 30%.

According to a preferred embodiment, water is caused to flow through a longitudinal space of predetermined dimension between the inner surface of said substantially non-deformable elongated hollow body and the outer surface of said optical core.

Another aspect of the present invention relates to a submarine optical cable comprising:
- at least a first elongated hollow body defining an inner surface;
- at least one optical core housed within said first elongated hollow body, said optical core comprising at least a second deformable elongated hollow body;
- at least one optical fiber loosely housed in said second deformable elongated hollow body;
- a longitudinal cavity defined inside said first elongated hollow body and outside said deformable elongated hollow body;
- a waterblocking element disposed within said cavity;

wherein:
- a water flow through said first deformable elongated hollow body has a first head loss;
- a water flow through said longitudinal cavity has a second head loss;
- said second head loss being lower than said first head loss.

Preferably, said first elongated hollow body is a substantially non-deformable elongated hollow body.

According to a preferred embodiment, the cross-sectional area defined by the inner surface of the non-deformable elongated hollow body is greater than the cross-sectional area defined by the outer surface of the optical core, so that a longitudinal cavity between the inner surface of the non-deformable elongated hollow body and the outer surface of the optical core is defined, through which water can flow with less head losses than inside the elongated hollow body.

In the present description, the term "optical core" is meant to relate to the inner structure of an optic cable, wherein optical fibers are disposed. In particular, said optical core may comprise a single central deformable buffer tube containing the optical fibers housed therein or may comprise a number of deformable buffer tubes disposed with a helical lay around a central reinforcing element. Said optical core may further optionally comprise yarns and/or tapes (e.g. a waterswellable tape) wrapped around the central buffer tube or around the group of stranded buffer tubes.

The term "substantially non-deformable elongated hollow body" refers in the present description to an elongated hollow body, e.g. a tube or an annular helical lay of wires presenting arch characteristics, which is dimensioned so as to sustain the hydrostatic pressure of the water at the laying depth of the cable without undergoing substantial structural deformation.

According to a preferred embodiment, said substantially non-deformable elongated hollow body is a metal tube, e.g. of copper, steel or aluminum, having a predetermined thickness, elastic modulus and yield strength so as to resist to a selected hydrostatic pressure. Such a metallic tube provides an hermetic protection towards radial penetration of water or gases into the inner structure of the cable where the optical core is located and can be used, in particular if it is made of copper, for supplying electric power to the system components. As an alternative, said substantially non-deformable elongated hollow body can be formed by an annular lay of metal wires, e.g. of steel, preferably wound as a helical lay around the optical core, said helical lay presenting the characteristics of an arch for withstanding the relevant hydrostatic pressure of the selected depth. In this latter case, the annular lay of metal wires can be in turn surrounded by a metal tube, e.g. of copper or aluminum, capable of hermetically protecting the inner structure of the cable from radial penetration of water or gases.

According to a preferred embodiment, the inner diameter of said metallic tube should preferably exceed the outer diameter of the optical core of from about 0.2 mm to about 1.5 mm, much preferably of from about 0.4 to about 1.0 mm, a difference of about 0.5–0.6 mm between the two diameter being particularly preferred.

The term "deformable elongated hollow body" refers to an elongated hollow body, e.g. a tube, capable of being deformed, in particular compressed, by the hydrostatic pressure caused by the water on its outer surface at the selected depth of lay. Typically said tube is filled for less than about 95% of its volume, e.g. from about 80% to about 95%, with a waterblocking filling composition.

Preferably, said deformable elongated hollow body is a tube having one or more layers of polymeric material, for instance polyester (e.g. polybutyleneterephtalate), polyolefin (e.g. polyethylene, polypropylene, copolymer ethylene-propylene), or polyamide, having a predetermined thickness and elastic modulus so that when a hydrostatic pressure of a selected degree is applied on the outer surface of said tube (as a consequence of the water penetration at the relevant laying depth of the cable), the tube is sufficiently compressed so as to reduce the void volume inside the mass of the filling material, thus reducing the distance covered by the water flow. Advantageously, the compression of said tube should be such as to reduce its original cross-sectional area of at least about 3%, preferably of at least 5%, when subjected to the relevant hydrostatic pressure.

According to an embodiment of the present invention, said deformable elongated hollow body is a polymeric buffer tube disposed in a helical lay around a central supporting member.

According to an alternative embodiment, said elongated hollow body is a single plastic tube coaxially disposed within said non-deformable elongated hollow body.

The water blocking element disposed within the longitudinal cavity along the deformable elongated hollow body should be such as to allow the water penetrating in said longitudinal passage to flow with less head losses than inside the deformable elongated hollow body at the initial stage of the penetration while allowing said head losses to gradually increase in time, eventually blocking the flow of water in said longitudinal passage within a predetermined length of the cable from the inlet point of the water.

In general, the block of water is intended to be effective if water penetrates inside the cable for a distance of less than 1000 meters in two weeks.

Preferably, said water blocking element is a water blocking tape which is wrapped around the optical core or around the deformable hollow body. When said deformable hollow body is a polymeric buffer tube disposed in a helical lay around a central supporting member, the water blocking tape may be wrapped around the buffer tubes already stranded around the central support member.

Alternatively, said water blocking element can be a filling material, e.g. an elastomer or a jelly-like composition, discontinuously disposed along the longitudinal direction of said longitudinal passage.

DETAILED DESCRIPTION OF THE INVENTION

Figure 1:
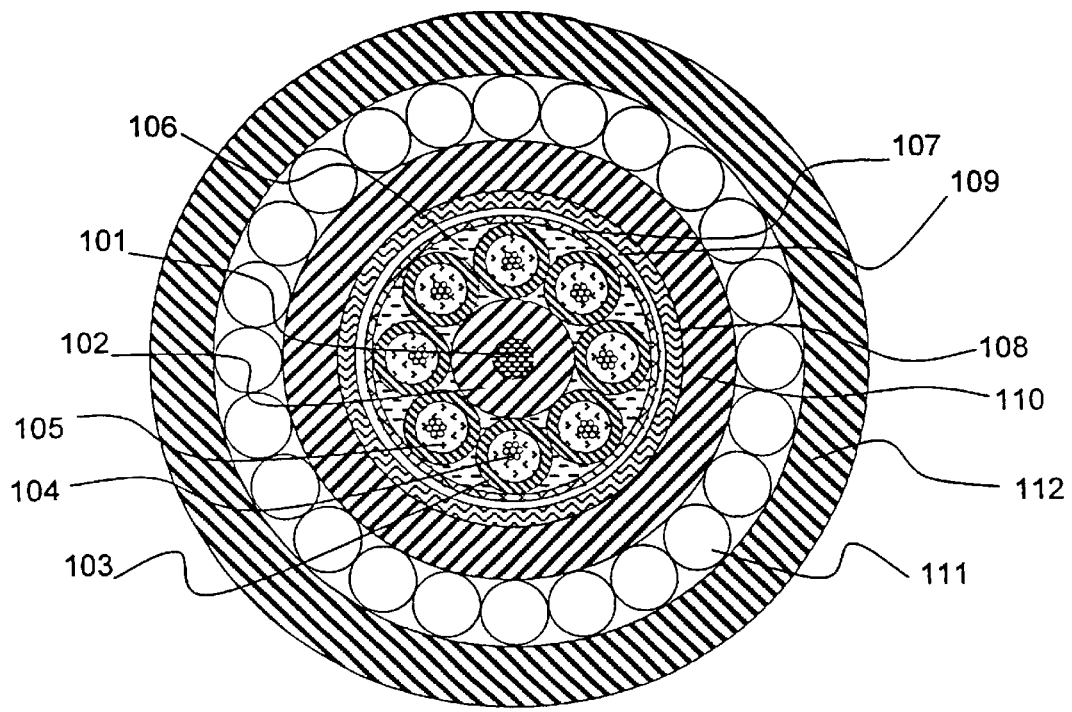
FIG. 1 is a cross-sectional view of a cable according to the invention.

The cable of FIG. 1 comprises a central strength member (101) (so-called bead wire) made of e.g. steel or glass reinforced plastic (GRP), coated with a polymeric jacket (102), made of e.g. polyethylene. External diameter of the coated strength member is about 3–8 mm, depending on the number of buffer tubes stranded around it. In case of eight buffer tubes, it can be of about 4–5 mm.

A number of buffer tubes (103), having an internal diameter of e.g. from about 1.5 to about 2.5 mm, preferably of about 1.8 mm, and a thickness of e.g. from about 0.2 to about 0.6 mm, preferably of about 0.4 mm, are disposed in a helical lay around the coated strength member.

The helical lay of the buffer tubes around the strength member can be accomplished as a continuous helix or, preferably, as an alternate (or S-Z) helix.

Optionally, a second layer of buffer tubes (not shown) can stranded around the first layer of buffer tubes.

The polymeric material which forms said buffer tubes should have a sufficiently high elastic modulus (e.g. of at least about 200, preferably at least 500 MPa MPa or higher, determined according to ASTM D638 91) in order to impart the desired protection to the optical fibers housed therein. Said modulus should not however be too high (e.g. below about 3000 Mpa), in order to allow a tube with the selected thickness to be effectively compressed by the hydrostatic pressure caused by the water on the outer surface of the tube.

Suitable polymeric material for manufacturing said buffer tubes can be, for instance, polybutylenterephtalate (PBT), polyethylene (PE), high density polyethylene (HDPE), polypropylene (PP), ethylene-propylene copolymers or polyammide (PA). Preferably, the material employed for manufacturing said buffer tubes is PBT, such as the one marketed under the name Celanex 2001® by Hoechst Celanese, or HDPE such as the one marketed under the name Finathene by Fina or Eraclene by Polimeri Europa.

The thickness of such buffer tubes may vary from about 0.2 mm to about 0.6 mm, depending from the elastic modulus of the material and from the outer diameter, in order to protect the fibers during the manufacturing process and the cable installation. In addition, the dimensions and elastic modulus of the material of said buffer tubes should be selected in such a way as to allow a substantial compression of said tube to take place in case of water penetration at the selected operative depth. The internal diameter of the buffer tubes is typically from about 1 mm to about 3 mm. For instance, a buffer tube made of polybutylenterephtalate (elastic modulus of about 2000 Mpa at 23° C.) intended to operate at a depth of about 1000–2000 m under the sea level, will preferably have a thickness of about 0.4 mm and an internal diameter of about 1.8 mm.

A number of optical fibers (104) is loosely housed inside the buffer tubes (twelve for each of the eight buffer tubes in the exemplified embodiment of FIG. 1), said optical fibers being immersed in a jelly-like filler (105).

Said jelly-like materials typically comprise a base oil, for example of the silicone, mineral (naphthenic or paraffin), or synthetic type (such as polyalphaolefins). This base oil typically requires the addition of a "viscosity improver" such as an elastomeric polymer with a low glass transition point, which by imparting viscosity to the solution improves its performance as a filling material. The filler composition may also contain an antioxidant and a thickening/thixotropic agent, consisting of more or less silanized pyrogenic silica. Examples of such filler composition are disclosed, for instance, in U.S. Pat. No. 5,455,881 or in European patent application no. EP 811.864.

Such jelly-like filler should have a viscosity sufficiently low to be easily introduced into the buffer tubes during the manufacturing process and to allow a substantially free relative movement of the fibers inside the tube. The viscosity of said jelly-like filler should however be sufficiently high in order to oppose a sufficient physical barrier to the longitudinal flow of water accidentally penetrated inside the tube. Typically, said jelly-like material will thus have a viscosity (determined using a Rheomat 115 Contraves viscometer at a shear rate of 1.56 sec$^{-1}$) of from about 50 to about 220 Pa·s, preferably of from about 60 to about 100 Pa·s. Examples of jelly-like materials suitable for being used as water-blocking filler inside the above buffer tubes are LA444® (Info-Lab, Huber Group), H55 by SICPA.

As previously mentioned, the filling of the buffer tubes with the jelly-like material can be accomplished during manufacturing of the cable for only about 80–95% of the total internal volume of the tube, thus leaving about 5–20% of voids inside the buffer tube.

In the interstices (106) between the stranded buffer tubes, a water blocking jelly-like composition or, alternatively, an elastomeric material can be disposed. Said jelly-like material typically comprises (as the filler of the buffer tubes) a base oil, a "viscosity improver" and optionally an antioxidant and a thickening/thixotropic agent. The composition of this jelly-like material will however preferably have a higher viscosity with respect to the one disposed inside the buffer tubes, which higher viscosity allows for a more effective barrier against longitudinal flow of water. The viscosity of said second jelly-like material can thus be of from about 200 to about 500 Pa·s, preferably of from about 300 to 400 Pa·s. Suitable jelly like materials are commercialized, for instance, by Amoco (CI500®) or by BP (NAPTEL® 947). Optionally, said jelly-like compositions for filling interstices (106) can be provided with hydrogen adsorbing means such as, for instance, the compositions disclosed in U.S. Pat. Nos. 4,741,592 and 5,455,881.

For further improving the water blocking properties of said filling material, a water swellable powder (i.e. a compound having the property of gelling/swelling upon water absorption), such as sodium polyacrylate or polymethacrylate, can be advantageously added to the jelly-like composition. The amount of said water-swellable powder may be in the range of from about 20% to about 70% by weight of the total composition, preferably in an amount of about 50%.

Examples of suitable jelly-like material containing water swellable powders for filling interstices (6) are disclosed, for example, in U.S. Pat. No. 5,715,343.

The elastomeric material can be, for instance, a water blocking hydrophobic elastomer, such as polyurethane resin.

The filling of the interstices with the elastomeric or jelly-like material can be accomplished in a continuous manner, i.e. the interstices between the buffer tubes are completely filled for their whole length with such water blocking material. In this case, water is substantially prevented by longitudinally flowing along said interstices.

Alternatively, the filling of the interstices can be accomplished in a discontinuous manner, in such a way that from about 10% to about 80%, preferably from about 20% to about 60% of the total length of the interstices is left free of filler. For instance, a discontinuous filling can be accomplished by completely filling a number of longitudinal portions of the interstices with the water blocking material, each of said filled portions being separated by the subsequent one by a portion substantially free of said filling material. For instance, a cable according to the invention can have longitudinal portions of the interstices completely filled with the water blocking material for a length of from about 2 m to about 30 m, separated by portions free of said material having a length of from about 10 m to about 50 m.

In particular, in case of an incomplete filling, said incomplete filling of the interstices is accomplished in such a manner as to leave a longitudinal passage along said interstices wherein water accidentally penetrating inside the cable can flow with less head losses than inside the buffer tube.

Stranded tubes are generally bound together with a polymeric yarn or tape (not shown), e.g. a polyester or polypropylene yarn, in order to held them firmly in their helical configuration during manufacturing processes.

A further polymeric tape (not shown) can be optionally wound with overlapping around the stranded buffer tubes in order to allow an effective containment of the interstitial water-blocking filler. Such polymeric tape, for instance polyester (e.g. Mylar®), has a thickness of about 25 to 50 µm and can be helical wound around the stranded buffer tubes with a overlap of about 3 mm.

A water-blocking (or water swellable) tape (107) is then wound around the whole structure. Such water-blocking tapes generally comprise a polymeric base tape on the surface of which a superabsorbent swellable material (e.g. polyacrylate or polymethylmethacrylate) in the form of powder is chemically or thermally fixed. The polymeric tape can be either a single tape, for instance of nonwowen material (e.g. polyester) onto which the superabsorbent material is fixed, or a double layer of polymeric film, for instance one layer of nonwowen material and the other of laminated material (e.g. polyethylenterephtalate) where the superabsorbent powder is disposed inbetween them. Water-swellable tapes suitable for the present invention are those commercialized by Freudenberg under the trademark Viledon®, e.g. Viledon® K3415, K3416, K3417 or K3516. Viledon® K3417 has been shown to be particularly suitable.

The whole structure, comprehensive of the strength member, buffer tubes and water-blocking tape, forms the so-called optical core of the cable. Such an optical core, of substantially cylindrical form, generally has an outer diameter of from about 6 to about 15 mm, for instance of about 10.5 mm.

The optical core is housed into a hermetic metallic tube (108), preferably made of copper, the inner diameter of said metallic tube slightly exceeding the outer diameter of the optical core of about 0.5–0.6 mm. In particular, said difference between the above two diameters should be sufficiently high so to create a passage (109) of sufficient cross-sectional area through which water can flow with less head losses than inside the buffer tube. On the other side, said difference should nevertheless be rather small, so to allow the water-swellable tape to effectively block the flow of water through said passage within a predetermined penetration length, after the initial ingress of water has taken place. Thus, the inner diameter of said metallic tube should preferably exceed the outer diameter of the optical core of from about 0.2 mm to about 1.5 mm, much preferably of from about 0.3 to about 1.0 mm, a difference of about 0.5–0.6 mm between the two diameters being particularly preferred.

Said metallic tube, which has to be self-supporting, will have a thickness of from about 0.6 to about 1.5 mm, preferably of from about 0.9 to about 1.1 mm.

Advantageously, as disclosed in British Patent Application no. GB 2,253,717, the metallic tube can be manufactured from a metal strip which, upon edge-folding and welding, results in a metal tube having a diameter slightly larger than the final one. The welded tube is then reduced down to the final diameter by passing it through reducing rollers, the diameter reduction of the tube advantageously increasing the yield strength of the metal material. For instance, the metal strip may have a width of about 53 mm, such that upon folding and welding, the resulting tube has an outer diameter of about 17 mm, which diameter is then reduced down to a final outer diameter of about 12.8 mm.

A sheath (110) of polymeric material is disposed to surround the metallic tube (108). For instance a sheath of medium or high density polyethylene can be used, having a thickness of from about 2 to about 4 mm.

A layer of metallic wires (111) (made of e.g. galvanized steel) is helical disposed around the polymeric sheath (110) in order to provide the desired armoring to the cable. An outer protective sheath (112) is then disposed to surround metallic armoring, said protective sheath comprising, for instance, HDPE jacketing or polymeric yarns (e.g. of polypropylene) embedded into a bituminous compound. If desired, the protection of the cable can be further increased by stranding a second layer of metallic wires (sheathed with a respective outer protective sheath) around said protective sheath (112).

Figure 2:
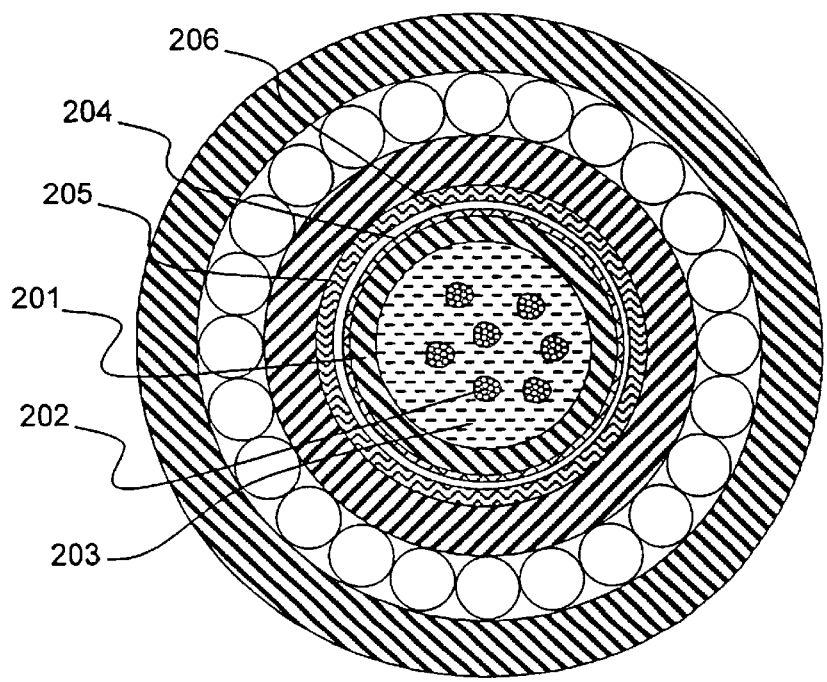
FIG. 2 is a cross-sectional view of an alternative embodiment of a cable according to the invention.

FIG. 2 shows an alternative embodiment of a cable according to the invention, comprising a single polymeric buffer tube (201), having an inner diameter of from about 1.5 to about 7.0 mm and a thickness of from about 0.3 to about 1.0 mm, wherein optical fibers (202) are housed and immersed into a jelly-like filler (203) as previously described. According to this alternative embodiment, groups of e.g. twelve optical fibers can be grouped into sub-units and enveloped by a thin layer of a low tensile modulus polymeric material (e.g. polyvinylchloride, ethylene-vinylacetate polymer, polyethylene or polypropylene) to form a sub-module (202). The polymeric layer can be colored in order to facilitate the identification of the fibers. Around the buffer tube (201) a water blocking tape (204) as previously described is wound in a helical lay, thus forming the optical core. The optical core is centrally disposed within a metal tube (205), similar to the one previously described, with a gap (206) separating the two tubes. As in the cable shown in FIG. 1, the inner diameter of the metal tube exceeds the diameter of the central plastic tube wrapped with the water-absorbing tape from about 0.2 mm to about 1.5 mm, preferably from about 0.4 to about 1.0 mm, a difference of about 0.5–0.6 mm between the two diameter being particularly preferred. As in the embodiment shown in FIG. 1, a sheath of polymeric material is disposed to surround the metallic tube, then one or more layer of metallic wires is helical disposed around the polymeric sheath and an outer protective sheath is then disposed to surround metallic armoring.

Figure 3:
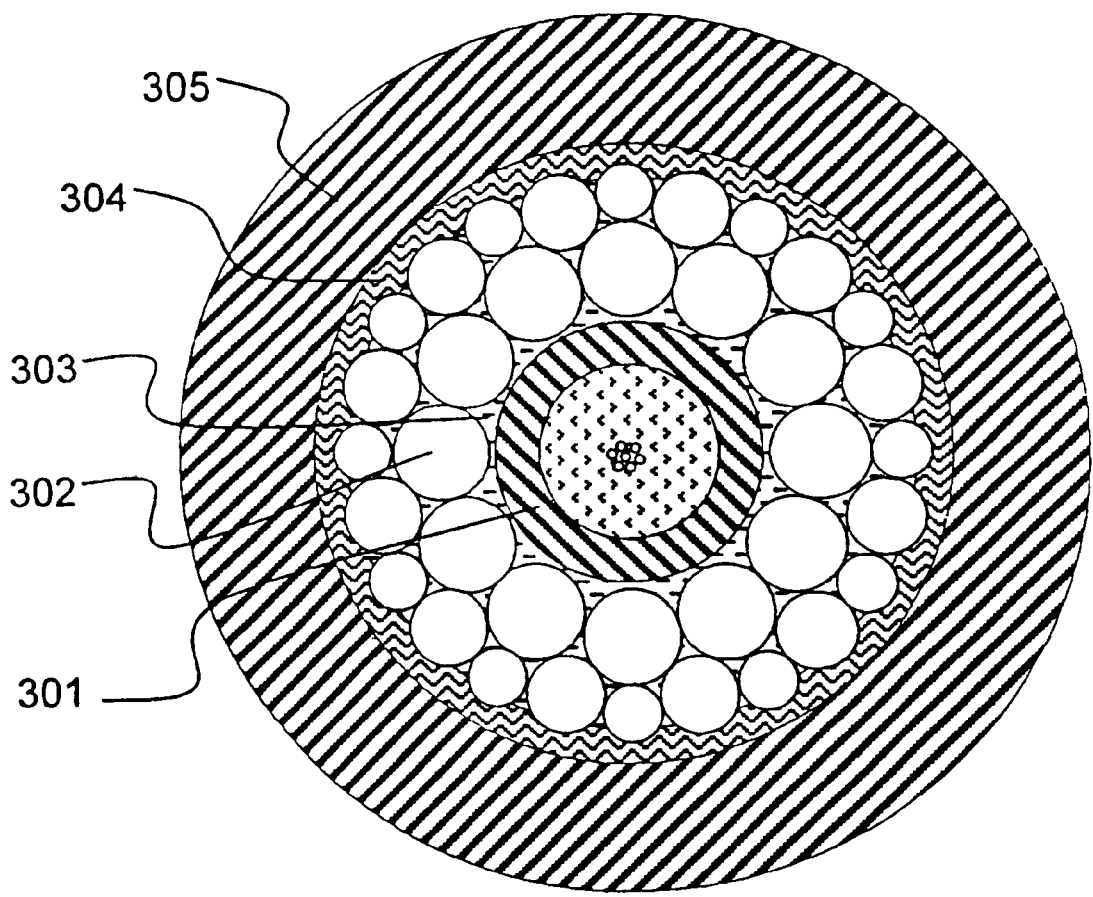
FIG. 3 is a cross-sectional view of a further alternative embodiment of a cable according to the invention.

FIG. 3 shows a further alternative embodiment of a cable according to the invention, wherein a single polymeric buffer tube (301) as the one described in FIG. 2, is centrally disposed within a layer of metallic wires (302), said metallic wires being disposed in a helical lay around the buffer tube and presenting the characteristics of an arch for withstanding pressure. The outer surface of the buffer tube can be in contact with the surface of the metallic wires or, preferably, as shown in FIG. 3, a small gap of e.g. about 0.1–0.2 mm is left between said two surfaces.

In this embodiment, no water blocking tape is disposed on the surface of the central tube, but a suitable water blocking material (e.g. elastomeric or jelly-like material, as previously mentioned) is discontinuously disposed in the interstices (303) between the outer surface of the buffer tube and the metal wires. In particular, as previously mentioned, said incomplete filling of the interstices is accomplished in such a manner as to leave a longitudinal passage along said interstices, wherein water accidentally penetrating inside the cable can flow with less head losses than inside the central buffer tube. The water blocking material can be a two part polyurethane elastomeric cable filling compound "D" ENCAPSULANT by CasChem, filling a length of about 20–30 m separated by a portion free of said material having a length of about 20–30 m.

An alternative filling compound can be a jelly-like material containing about 50% of water swellable powder. In this case the filled portion of the cable has a length of about 2–5 m, separated by empty portions having a length of about 20–50 m.

A metal sheath (304) (e.g. of copper) is then formed around the helical lay of metal wires and an outer polymeric sheath (305) is disposed to surround the metal sheath.

As mentioned along the above description, the cable structure provided by the present invention is such that the head loss of the water flow through the longitudinal cavity along the buffer tubes is lower than the head loss of the water flowing inside said buffer tubes. Thus, in a cable according to the present invention, in case of accidental ingress of water inside the submarine cable, the water flow inside the buffer tubes is prevented from reaching long penetration lengths. On the other side, said lower head loss of the water flow through the cavity will allow the water to penetrate for a longer distance along said cavity than inside said buffer tubes. For instance, the penetration length of the water flow along said cavity can be about twice the penetration length of the water flow inside the buffer tube within 2 weeks, and up to about 10 times said penetration length.

In particular, the applicant has observed that a cable structure according to the present invention is particularly effective to block the water flow inside the deformable elongated hollow body if the longitudinal cavity surrounding said elongated body is dimensioned in such a manner that the head losses of the water flow along said longitudinal cavity are rather lower with respect to the head losses of the water flow inside the deformable elongated hollow body. Advantageously, the head loss of the water flow along said longitudinal cavity are lower than about 75% of the head loss of the water flow inside the deformable elongated hollow body, preferably lower than about 50%, much preferably lower than about 30%.

As known, the head losses (H) of a fluid flowing into a conduit are inversely proportional to the hydraulic radius (r) of said conduit, i.e.

$$H \propto 1/r^4$$

The hydraulic radius is given by the ratio A/P, where A is the cross-sectional area of the conduit through which the fluid flows and P is the perimeter wetted by said flow. In case of tubular conduits of circular cross-section, r is thus half the geometrical radius of the conduit, while in case of annular cross-section conduits, r is half the width of the annular conduit.

In order to obtain a rough indication of the head losses of the water flow inside the buffer tube, it can be assumed that the incomplete filling of the tube generates a corresponding channel of constant section through the filling mass. For instance, taking into account a buffer tube having an internal diameter of about 1.8 mm and filled at 90% with a filling mass, a circular cross-section channel of about 0.57 mm diameter can be assumed to be created inside the filling mass, thus with a hydraulic radius of about 0.14 mm. The hydraulic radius of the longitudinal cavity disposed along said buffer tube should thus be of at least about:

$$r = (1/(0.14)^{4.75}/100)^{-0.25} = 0.15.$$

This should correspond (see FIG. 1) to a gap between the outer surface of the buffer tube and the inner surface of a metallic tube and the outer surface of the optical core of about 0.3 mm, i.e. a difference between the outer diameter of the buffer tube and the inner diameter of the metallic tube of about 0.6 mm.

Applicant has however observed that:

the effective hydraulic radius the circular cross-section channel inside the buffer tube is in general smaller than the one determined theoretically; and if the waterblocking tape is made from a non-woven fabric, said tape may partially contribute (for about ⅓ of its thickness) to determine the longitudinal annular cavity through which water flows.

Accordingly, the effective gap between the metallic tube and the outer surface of the optical core (comprised of the thickness of the waterblocking tape) can be lowered, in the above case, at about 0.5 mm.

As a general rule, the dimensioning of said longitudinal cavity will thus depend from the dimensions of the single buffer tubes and from the percentage of voids within the filling material. In general, the larger the diameter of the buffer tube and the higher the percentage of voids inside the filling mass are, the larger said longitudinal cavity should be and accordingly the higher the swelling of the waterblocking tape.

Although not wishing to be bound by any particular theory, the applicant believes that by providing such longitudinal cavity with predetermined dimensions around the buffer tube, the water accidentally penetrating inside said cavity causes a hydrostatic pressure to be generated onto the outer surface of the buffer tube, which pressure causes the buffer tube to be compressed, thus substantially reducing the void volume inside the mass of the filling material and, consequently, the distance covered by the longitudinal flow of water inside said buffer tube.

Figure 4:
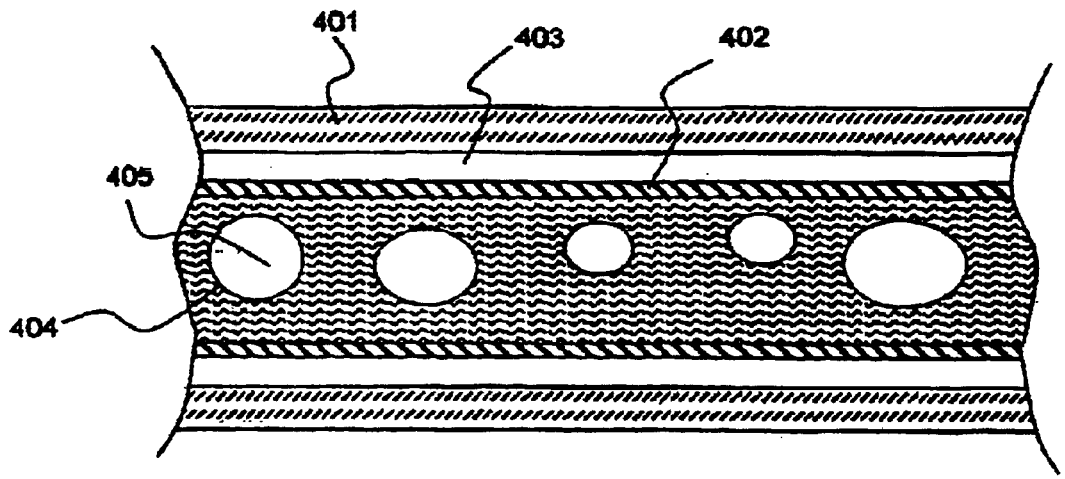
FIGS. 4 and 4a show a schematic longitudinal cross-section of a cable according to the invention before and after water ingress, respectively.
Figure 4A:
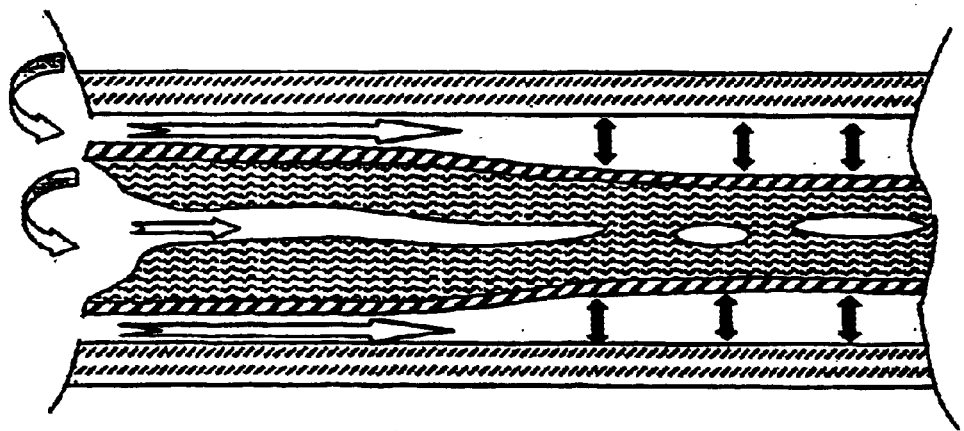

This supposed mechanism of water-block can be better understood by referring to FIGS. 4 and 4a.

FIG. 4 shows a schematic longitudinal cross-sectional view of the inner portion of a cable according to the invention, before water penetration, comprising a metal tube (401) surrounding a polymeric buffer tube (402), the two tubes being separated by the cavity (403). A filling mass (404) is disposed inside the buffer tube. As illustrated in the drawing, a number of voids (405) are present within the filling mass. For the sake of clarity, the optical fibers contained within the buffer tube and the water blocking tape surrounding the buffer tube have been avoided.

Upon water ingress (indicated by curved arrows in FIG. 4a), the longitudinal cavity (405), presenting a preferential path for the water flow, allows for a more rapid flow of water (indicated by white straight arrows) along said cavity than inside the buffer tube. Few instants after the water inlet, the water will thus penetrate along said longitudinal cavity for a rather long distance (e.g. about 20–50 m after about 20–30 seconds). Said water surrounding the buffer tube will thus cause a hydrostatic pressure to act onto the outer surface of the buffer tube (shown by black double headed arrows in FIG. 4a).

On the other hand, after the same few instants, because of the relatively higher head losses to which it is subjected, the water flow inside the buffer tube will penetrate for a relatively shorter distance (e.g. less than few meters). Therefore, the hydrostatic pressure acting from the inside of the buffer tube will be limited to the initial portion of the tube, while after few meters the hydrostatic pressure will only act (due to the presence of water into the longitudinal cavity) on the outer surface of said tube. This will thus cause the buffer tube to be compressed, thus substantially reducing the void volume inside the mass of the filling material. The void volume reduction inside the buffer tube determines a corresponding reduction of the cross-sectional area through which water can flow, thus further increasing the head losses of the water flow, with a consequent further reduction of the distance covered by the longitudinal flow of water inside said buffer tube. In order to effectively reduce the void volume inside the buffer tube, the compression of said tube should be such as to reduce its original cross-sectional area of at least about 3%, preferably of at least 5%, when the tube is subjected to the relevant hydrostatic pressure.

In order to suitably control the water flow along the longitudinal cavity surrounding the buffer tube and block it within a predetermined length from the inlet zone, a water blocking material is disposed in said longitudinal cavity.

For instance, if the water blocking material is a water swellable tape wrapped around the buffer tube, upon contacting water the waterswellable powder disposed onto the tape will begin to swell, thus occluding (first partially and then totally) the cavity surrounding the buffer tube, and avoiding further ingress of water. In addition, the swelling of the water swellable powder will determine an increase in the viscosity of the fluid, thus further increasing its head losses. In order to effectively block the water flow along the longitudinal cavity within the desired length, the tape, upon swelling, will preferably occupy at least 50% of the longitudinal cavity within the first minute from the water penetration, more preferably at least about 75% of said cavity. The swelling of the tape contributes, together with the hydrostatic pressure, to effectively compress the buffer tube, in order to block the water flow within it.

When the water blocking material is an elastomer or a gel-like filling composition which are discontinuously disposed along the longitudinal direction of said cavity, the water penetrated inside said cavity should also be allowed to initially flow rather rapidly along said cavity. Thus, the discontinuous filling of the longitudinal cavity should be accomplished in such a way that a single portion of the material will cause a relatively low increase in the head losses of the water flow, in order to allow said flow to cover a sufficiently longer distance with respect to the flow inside the buffer tube and to allow the corresponding hydrostatic pressure to effectively compress said buffer tube. After flowing through a suitable number of subsequent portions of filling material (e.g. 3–5 portions), the head losses of the water flow will reach the limit value and the water flow will then be prevented from further flowing along the cavity.

Applicant has further observed that in case the hydrostatic pressure caused by the water (or by the combined action of waterswelling tape and water) is relatively high, it may happen that the tube is subjected to a compression higher than the yield point at compression of the plastic material forming said tube. In this case, the tube can be permanently deformed by such pressure. In general, in case the compression of the tube is not higher than the yield point at compression of the material forming the tube, upon removal of the hydrostatic pressure (i.e. when the cable is brought at the sea level at atmospheric pressure), the buffer tube will recover its original dimensions.

Figure 5:
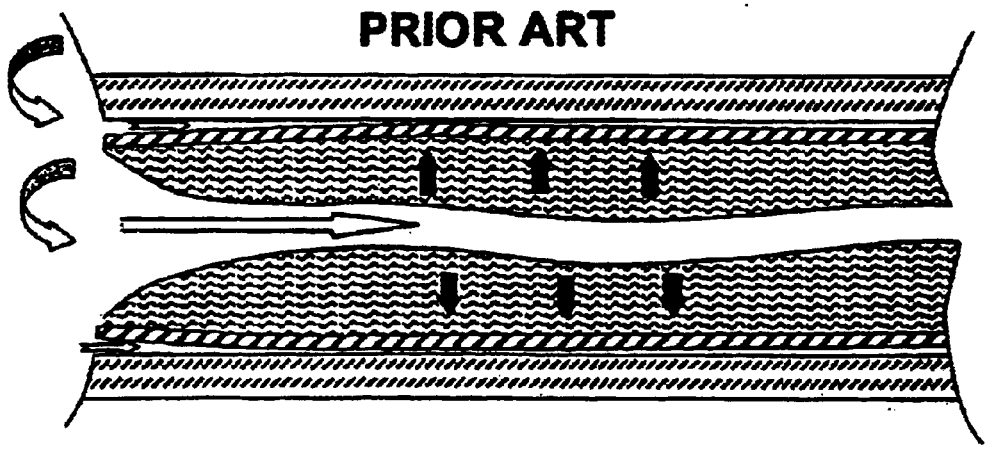
FIG. 5 show a schematic longitudinal cross-section of a comparative cable after water ingress.

FIG. 5 shows a comparative example of a cable wherein the longitudinal cavity surrounding the buffer tube is insufficient to operate according to the invention. In this case, the head losses of the water flowing within said cavity are higher than those generated onto the water flowing inside the buffer tube. Water will thus preferentially and more rapidly flow inside the buffer tube than along the longitudinal cavity, and the hydrostatic pressure (black arrows) will act in this case only from the inside of the buffer tube. The result of such hydrostatic pressure acting onto the walls of the buffer tube may be such as to increase the diameter of said tube, thus increasing the void volume inside the filling mass. As a consequence, head losses generated onto the water flowing inside the buffer tube will be further reduced, thus causing the water to penetrate for a substantial length along said buffer tube.

Although in the above description reference has been made to the longitudinal cavity between the outer surface of the polymeric buffer tube and the inner surface of the metal tube, it will be understood that also the interstices (106) inbetween the buffer tubes (see FIG. 1) can advantageously act as a longitudinal cavity wherein water can flow with less head losses than inside the buffer tubes. This further longitudinal cavity can be used either in addition to the gap between the buffer tubes and metallic tube or in the absence of such gap. In order to control the water penetration length along the interstices, said interstices can be discontinuously filled with a water blocking material or each buffer tube can be wrapped with a water blocking tape.

EXAMPLES

Example 1 a) Structure of a Cable According to the Invention

With reference to the cable shown in FIG. 1, the following cable has been manufactured for being tested against water penetration. The optical core of such cable comprises:

- a central element comprising a bronzed steel wire of 0,96 mm diameter, coated with DHDA-8864 BLACK 9865 (UNION CARBIDE) polyethylene up to a diameter of 4,5 mm
- 8 buffer tubes of Celanex 2001 (Hoechst Celanese) polybutylenterephtalate, having an outer diameter of 2,6 mm and an inner diameter of 1,8 mm, S/Z stranded around the central element, each containing 12 colored optical fibres and filled with LA444 gel (Info-Lab-Huber Group);
- a gel like filler Amoco CI500 completely filling the interstices between the buffer tubes;
- two with polyester yarns for binding the buffer tubes;
- a polyester tape (Mylar®) helically wound around the stranded buffer tube with a overlap of about 3 mm and having a thickness of about 50 μm
- a Viledon K 3417 (Freudenberg) water-blocking non-woven tape having a thickness of about 0.25 mm and a width of about 30 mm, helically wound around the polyester tape with an overlap of 3 mm.

Such optical core, having a final diameter of 10.5 mm, is disposed within a copper tube having a thickness of 0.9 mm, an inner diameter of 11 mm and an outer diameter of 12,8 mm, the difference between the outer diameter of the optical core and the inner diameter of the metal tube being thus of 0.5 mm.

The copper tube is manufactured from a UNS C10300OFXLP (ASTM Standard) copper tape (Langenberg, Del.) having a width of 58 mm and a thickness of 0.9 mm.

After edge-cutting and folding, the tape is formed around the optical core into a tube of 17 mm diameter which is then TIG (tungsten inert gas) welded.

The welded tube is then reduced down to the final external diameter of 12.8 mm by passing it through reducing rollers, as disclosed for instance in British Patent Application no. GB 2,253,717.

An external sheath of medium density polyethylene is disposed to surround the cooper sheath, up to a final external diameter of 17.2 mm.

For the purposes of evaluating the water penetration resistance properties of the cable, the tests have been carried out without introducing the external armoring surrounding the polymeric coated hermetic metal tube, as this armoring does not contributes to the overall water penetration resistance properties of the cable.

b) Water Penetration Test

The test has been carried out with using a 40 mm inner diameter steel pipe having a length of 880 m, capable of withstanding a hydrostatic pressure up to 550 bar. Rollers are disposed inside the pipe in order to facilitate the insertion of the cable.

The cable is inserted into the test pipe and one of its end is hermetically sealed by welding a brass cup onto said end. The other end of the cable is sealed with a rupture disc device (FIKE Europe N.V.) capable of suddenly break at the predetermined test pressure (100 bars in this case).

Once both ends of the cable have been sealed, the test pipe is hermetically closed at its ends and filled with water to reach the desired test pressure of 100 bars. A dye (fluorosceine) is added to water in order to easier determining the water penetration length. Once the test pressure has been reached, the rupture disc device suddenly breaks, allowing the water to penetrate inside the cable with a pressure of about 100 bars. The pressure is then stabilized at the above value and the cable is maintained under this conditions for 7 days.

At the end of the seventh day, water is discharged from the test pipe and the cable is extracted and analyzed.

For the analysis, the cable is cut, while extracting it, into subsequent portions of about 60 m length. Each portion is analyzed for the presence of water in the different parts of the cable. In particular, the analysis is directed to detecting the possible presence of water:

- outside the buffer tubes (e.g. in the gap between the metal sheath and the optical core, between the polyester tape, between the external intersticial area between the buffer tubes or between the internal intersticial area between the buffer tubes and the central element); and
- inside the buffer tubes.

In order to facilitate water detection, a "black light" lamp (Wood's lamp) is employed, which reveals the possible presence of fluorosceine.

Table 1 summarizes the results of the test.

TABLE 1

| | Water penetration test | | |
|---|---|---|---|
| | Water penetration | | |
| Distance from water inlet (m) | Inside buffer tubes | Outside buffer tubes | Remarks on the buffer tubes |
| 280 | No | No | Regular |
| 220 | No | Yes | Regular |
| 160 | No | Yes | Two tubes collapsed |
| 100 | No | Yes | Regular |
| 40 | No | Yes | Regular |

The results reported in table 1 show the penetration of water inside the buffer tubes was less than 40 meters, while the maximum penetration length outside the buffer tubes is about 220 m. The results of table 1 are in agreement with the supposed mechanism being that the hydrostatic pressure caused by the water on the external surface of the tubes prevents the water penetration inside the buffer tubes. In particular, the observed collapse of two buffer tubes at about 160 m from water inlet is an evidence that such pressure together with the pressure caused by the waterswelling powder of the water blocking tape was sufficiently high so as to impart a permanent deformation to the buffer tubes.

Example 2 (Comparative)

Cable with Insufficient Longitudinal Cavity

In order to verify that the longitudinal cavity surrounding the buffer tubes should be suitably dimensioned, a cable similar to the one described in Example 1 has been prepared, but having a reduced difference between the outer diameter of the optical core and the inner diameter of the metal tube of about 0.2 mm. For the test purposes, a short length cable (50 m) has been considered suitable.

Water at 100 bars has been applied at one end of the cable, while the other end has been left at ambient pressure.

After 30 minutes, the filler disposed inside the buffer tube begins to drop out from the free end of the cable, followed by the penetrated water, while no water penetration is observed in the gap between the optical core and the metal sheath.

This result confirms that if the gap between optical core and metal tube sheath is too small, head losses of water flowing within said gap become higher than the head losses generated onto the water flowing inside the buffer tubes. Thus, high pressure water will preferentially flow inside the buffer tubes instead through said gap.

In addition, the following law governing the penetration of water inside a tube:

$$L = K(P \cdot T)^{0.5}$$

wherein:

L: length of water penetration
K: constant of propagation (function of head losses)
P: test pressure
T: duration of the test, can be applied to determine the final penetration length after the standard time of two weeks ($L_f$).

Thus, being $L_{30}$ the penetration length after 30 minutes i.e. 50 meters):

$$L_f/L_{30} \text{ and } L_f = 50(14 \cdot 24 \cdot 60/30)^{0.5} = 1296 \text{ m}$$

which length is far higher than the required maximum penetration length of 1000 meters.

Example 3

Evaluation of the Effectiveness of the Longitudinal Cavity

In order to evaluate the effectiveness of the longitudinal cavity in the water blocking mechanism inside the buffer tubes, in the absence of any water blocking material disposed within said cavity, a cable as described in example 1 has been prepared, with the only difference that the water blocking tape has been removed.

A length of 10 meters of cable was tested. The difference between the outer diameter of the optical core and the inner diameter of the metal tube was of about 1 mm. Water at 100 bars has been applied at one end of the cable, while the other end has been left at ambient pressure.

Water almost immediately began to drop from the open end of the cable in correspondence with the longitudinal cavity between the copper tube and the optical core, while after one minute from the beginning of the test, water penetration inside the buffer tubes was less than one meter.

Extrapolating the result of the test to the two weeks period as in Example 2, and assuming a one meter inside the tube, a total penetration of about 142 meter is calculated. This result, compared with the one of example 2, is in accordance with the supposed mechanism of limitation of the water flow inside the buffer tube, due to compression of same by the hydrostatic pressure acting onto the outer surface of the buffer tube by the water penetrating the longitudinal cavity surrounding said buffer tube.

What is claimed is:

1. A method for controlling a longitudinal flow of water accidentally penetrated inside the structure of a submarine cable, said cable comprising a deformable elongated hollow body comprising at least one optical fiber loosely housed therein, the deformable elongated hollow body configured to allow a portion of the longitudinal flow of water to flow in the deformable elongated hollow body, wherein said method comprises providing a longitudinal cavity externally along the outer surface of said elongated hollow body, said longitudinal cavity being selected for causing the accidentally penetrated flow of water to flow along said cavity for a distance longer than the distance of the water flowing inside said deformable elongated hollow body.

2. A method according to claim 1, wherein said deformable elongated hollow body and said longitudinal cavity are selected in order to impart a first head loss to the flow of water flowing inside said deformable elongated hollow body, and a second head loss to the flow of water flowing along said longitudinal cavity, said second head loss being lower than said first head loss.

3. A method for controlling a longitudinal flow of water accidentally penetrated inside the structure of a submarine cable, comprising the steps of:

a) disposing within said cable structure a first elongated hollow body defining an inner surface; and b) disposing within said first elongated hollow body an optical core element comprising at least a second deformable elongated hollow body comprising at least one optical fiber loosely housed therein, the second deformable elongated hollow body configured to allow a portion of the longitudinal flow of water to flow in the second deformable elongated hollow body; wherein the dimensions of said second deformable elongated hollow body are selected to provide a longitudinal cavity between the outer surface of said second deformable elongated hollow body and the inner surface of said first elongated hollow body, said cavity defining a passage along which the water accidentally penetrated inside the cable flows with less head losses than inside the second deformable elongated hollow body.

4. A method according to claim 3, wherein said first elongated hollow body is a substantially non-deformable elongated hollow body.

5. A method according to claim 3, wherein said head losses of the water flowing along said longitudinal cavity are lower than about 75% of the head losses of the water flowing inside the deformable elongated hollow body.

6. A submarine optical cable comprising:

a) at least a first elongated hollow body defining a inner surface;

b) at least one optical core housed within said first elongated hollow body, said optical core comprising at least a second deformable elongated hollow body, the second deformable elongated hollow body configured to allow a portion of a flow of water accidentally penetrating inside the cable to flow in the second deformable elongated hollow body;

c) at least one optical fiber loosely housed in said second deformable elongated hollow body;

d) a longitudinal cavity defined inside said first elongated hollow body and outside said deformable elongated hollow body; and e) a waterblocking element disposed within said cavity, wherein the dimensions of said longitudinal cavity are selected in order to allow the flow of water accidentally penetrating inside the cable to flow with a first head loss along said first deformable elongated hollow body and with a second head loss through said longitudinal cavity, said second head loss being lower than said first head loss.

7. A cable according to claim 6, wherein said first elongated hollow body is a substantially non-deformable elongated hollow body.

8. A cable according to claim 6, wherein the cross-sectional surface defined by the inner surface of said first elongated hollow body is greater than the cross-sectional surface defined by the outer surface of the optical core, so that a longitudinal cavity between the inner surface of the non-deformable elongated hollow body and the outer surface of the optical core is defined, through which water can flow with less head losses than inside the elongated hollow body.

9. A cable according to claim 6, wherein said optical core comprises at least one deformable elongated hollow body disposed in a helical lay around a central supporting element.

10. A cable according to claim 6, wherein said optical core comprises a single deformable elongated hollow body centrally disposed within said first elongated hollow body.

11. A cable according to claim 6, wherein said deformable elongated hollow body is a tube of polymeric material.

12. A cable according to claim 11, wherein said polymeric material is selected from polyester, polyolefin and polyamide.

13. A cable according to claim 11, wherein said tube is filled for less than 95% of its volume with water-blocking filling composition.

14. a cable according to claim 7, wherein said substantially non-deformable elongated hollow body is a metallic tube.

15. A cable according to claim 14, wherein the inner diameter of said metallic tube exceeds the outer diameter of the optical core by from about 0.2 mm to about 1.5 mm.

16. A cable according to claim 7, wherein said substantially non-deformable elongated hollow body is an annular helical lay of metallic wires presenting arch characteristics.

17. A cable according to claim 6, wherein said water-blocking element is a water blocking tape wrapped around the optical core.

18. A cable according to claim 7, wherein said water-blocking element is a filling material discontinuously disposed along the longitudinal direction of said longitudinal cavity.

19. A cable according to claim 18, wherein said filling material is an elastomer or a jelly-like composition.

\* \* \* \* \*

UNITED STATES PATENT AND TRADEMARK OFFICE
CERTIFICATE OF CORRECTION

PATENT NO. : 6,681,070 B2
DATED : January 20, 2004
INVENTOR(S) : Feliciano Cecchi et al.

It is certified that error appears in the above-identified patent and that said Letters Patent is hereby corrected as shown below:

Title page,
Item [57], ABSTRACT,
Line 6, "suitable" should read -- suitably --.

Column 16,
Line 50, "a inner" should read -- an inner --.

Column 18,
Line 7, "a cable" should read -- A cable --.

Signed and Sealed this

Twenty-eighth Day of September, 2004

JON W. DUDAS
*Director of the United States Patent and Trademark Office*